(12) United States Patent
Meng et al.

(10) Patent No.: US 10,330,844 B1
(45) Date of Patent: Jun. 25, 2019

(54) BACKLIGHT UNIT AND DISPLAY DEVICE

(71) Applicant: BOE TECHNOLOGY GROUP CO., LTD., Beijing (CN)

(72) Inventors: Xiandong Meng, Beijing (CN); Xianqin Meng, Beijing (CN); Jifeng Tan, Beijing (CN); Wei Wang, Beijing (CN); Xiaochuan Chen, Beijing (CN); Yafeng Yang, Beijing (CN); Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/039,470

(22) Filed: Jul. 19, 2018

(30) Foreign Application Priority Data

Jan. 10, 2018 (CN) .......................... 2018 1 0022757

(51) Int. Cl.
*G02B 6/00* (2006.01)
*F21V 8/00* (2006.01)
*G02F 1/1335* (2006.01)

(52) U.S. Cl.
CPC ......... *G02B 6/0033* (2013.01); *G02B 6/0016* (2013.01); *G02F 1/133615* (2013.01)

(58) Field of Classification Search
None
See application file for complete search history.

(56) References Cited

U.S. PATENT DOCUMENTS

| | | | | |
|---|---|---|---|---|
| 5,703,667 A | * | 12/1997 | Ochiai ............... | G02B 6/0038 349/65 |
| 2004/0105046 A1 | * | 6/2004 | Taira ................... | G02B 6/0053 349/61 |
| 2012/0113678 A1 | * | 5/2012 | Cornelissen ......... | G02B 6/0038 362/607 |

FOREIGN PATENT DOCUMENTS

JP          2006-126238 A    *  5/2006

* cited by examiner

*Primary Examiner* — Michael Stahl
(74) *Attorney, Agent, or Firm* — Calfee, Halter & Griswold LLP

(57) ABSTRACT

A backlight unit includes a waveguide layer and a light source component. The waveguide layer includes a light-entering surface located its side surface, a bottom surface located at its bottom, and a light-exiting surface located at its top. A first grating layer is arranged at the bottom surface. A refractive layer is arranged at the light-exiting surface. The light source component is located beside the light-entering surface. The refractive layer includes a refractive lens unit. The refractive lens unit converges the diffracted light dispersed by means of the diffraction caused by the first grating layer when the backlight unit is in operation.

14 Claims, 3 Drawing Sheets

US 10,330,844 B1

BACKLIGHT UNIT AND DISPLAY DEVICE

RELATED APPLICATION

The present application claims priority to Chinese Patent Application No. 201810022757.9 filed on Jan. 10, 2018, the entire contents of which are hereby incorporated by reference.

TECHNICAL FIELD

The present disclosure relates to the field of display technologies, particularly to a backlight unit and a display device.

BACKGROUND

With the development of the times, the miniaturization of the liquid crystal displays has become a trend. A miniaturized liquid crystal displays requires its backlight to be a uniform and collimated surface light source. Currently, single-side collimated side-entry backlights are widely used in a variety of backlight implementations. However, in the related art, the grating structure in the backlight system may cause a certain level of chromatic aberration.

SUMMARY

The present disclosure provides a backlight unit comprising a waveguide layer and a light source component. The waveguide layer comprises a light-entering surface located at a side surface of the waveguide layer, a bottom surface located at a bottom of the waveguide layer, and a light-exiting surface located at a top of the waveguide layer. A first grating layer is arranged at the bottom surface. A refractive layer is arranged at the light-exiting surface. The light source component is located beside the light-entering surface. The refractive layer comprises a refractive lens unit. The refractive lens unit is configured to converge a diffracted light dispersed by means of diffraction caused by the first grating layer when the backlight unit is in operation.

In some embodiments, the light-entering surface is perpendicular to the light-exiting surface and the bottom surface is parallel to the light-exiting surface.

In some embodiments, the refractive layer comprises a plurality of refractive lens units arranged in a periodic manner.

In some embodiments, an emergent surface of the refractive lens unit is a spherical surface or a freeform surface.

In some embodiments, the distance S between an intersection of the diffracted light and the bottom surface and an orthographic projection point of an intersection of the diffracted light and the light-exiting surface on the bottom surface is:

$$S = L^* \tan \theta_j$$

wherein $\theta_j$ is the diffraction angle of the diffracted light, and L is the thickness of the waveguide layer.

In some embodiments, the refractive lens unit closest to the light-entering surface is in a location area where the diffracted light is refracted on the light-exiting surface for the first time, and the distance D between geometric centers of two adjacent refractive lens units is:

$$D = 2L^* \tan \theta_i$$

wherein $\theta_i$ is the incident angle of a light emitted by the light source component at the waveguide layer, and L is the thickness of the waveguide layer.

In some embodiments, the chromatic aberration value $\Delta L'_{FC}$ of the refractive lens unit is:

$$\Delta L'_{FC} = -L^*(\tan \theta_b - \tan \theta_r),$$

wherein $\theta_b$ and $\theta_r$ are respectively the diffraction angles of a blue light and a red light formed through diffraction, and L is the thickness of the waveguide layer.

In some embodiments, when the emergent surface of the refractive lens unit is a spherical surface, the radius r of the refractive lens unit is:

$$r = \frac{(1-n_r)\lambda_b(n_r-n_g)}{2A_1 n_b (\lambda_r - \lambda_g)},$$

wherein, $A_1$ is the paraxial focal power of the diffraction surface of the first grating layer, $\lambda_r$, $\lambda_g$, $\lambda_b$ are the wavelengths of a red light, a green light and a blue light respectively, and $n_r$, $n_g$, $n_b$ are refractive indexes of the red, the green light and the blue light respectively.

In some embodiments, the first grating layer comprises grating structures arranged in a periodic manner.

In some embodiments, the shape of the grating structure is rectangular or jagged.

In some embodiments, the material of the first grating layer is ITO or $Si_3N_4$.

In some embodiments, a second grating layer is arranged inside the waveguide layer.

In some embodiments, the backlight unit further comprises a lower substrate located at the bottom surface of the waveguide layer and an upper substrate located at the light-exiting surface of the waveguide layer. The refractive index of the upper substrate is greater than the refractive index of the refractive lens unit.

In some embodiments, the refractive index of the upper substrate and the refractive index of the lower substrate are smaller than the refractive index of the waveguide layer. The refractive index of the upper substrate is basically equal to the refractive index of the lower substrate Accordingly, the present disclosure also provides a display device. The display device comprises a backlight unit according to any of the embodiments of the present disclosure.

BRIEF DESCRIPTION OF THE DRAWINGS

Embodiments of the present disclosure will now be described, by way of example only, with reference to the accompanying schematic drawings in which corresponding reference symbols indicate corresponding parts, and in which.

DETAILED DESCRIPTION

Figure 1:
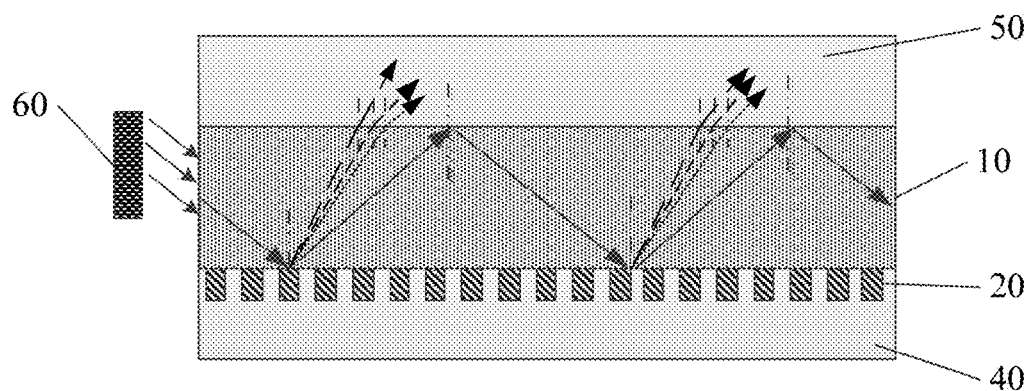
FIG. 1 schematically shows the chromatic aberration phenomenon on the backlight illumination caused by the waveguide grating in the collimated side-entry backlight.

Embodiments of the present disclosure are described in detail below. The examples of the embodiments are shown in the drawings, in which the same or similar reference numerals indicate throughout the same or similar elements or elements having the same or similar functions. The embodiments described below with reference to the drawings are illustrative. These embodiments are for illustrative purposes only and are not to be construed as limiting the disclosure.

A person having ordinary skill in the art will appreciate that, unless otherwise defined, all of the terms (including technical terms and scientific terms) used herein have the same meaning as commonly understood by the person having ordinary skill in the art. It should also be understood that the terms such as those defined in a general dictionary should be understood as having a meaning consistent with the meaning in the context of the related art. Meanwhile, unless specifically defined, the terms will not be interpreted in an idealized or overly formal meaning.

With the development of the times, the miniaturization of liquid crystal displays has become a trend. Miniaturized liquid crystal displays are used in for example mobile phones, digital cameras, calculators, watches, and the like. The display screens of these small-sized electronic products are getting smaller, so do their pixel units. In order to avoid crosstalk and improve contrast, such a liquid crystal display requires a backlight with higher collimation property. This requires that the backlight is a uniform and collimated surface light source.

At present, among various backlight implementations, the single-side collimated side-entry backlight is a backlight implementation having great application value. The front backlight technology refers to a technology in which the light emitted by the light source is uniformly transmitted along the plane of the electronic ink screen or the liquid crystal screen without directly illuminating the eyes. This is quite different from backlight panel display light sources. This display method makes reading more comfortable and does not make people feel glaring. Therefore, it is widely used in display devices such as electronic paper books, etc.

In the related art, commonly, the light angle is adjusted by means of a grating layer provided on one side of the waveguide layer. However, after the light transmitted by the total inner reflection in the waveguide layer is destroyed by the grating layer, a certain level of chromatic aberration will appear in the diffracted light beam. FIG. 1 schematically illustrates the principle of the chromatic aberration on the backlight caused by a waveguide grating in a collimated side-entry backlight. This phenomenon has a certain impact on the display effect of the display. The present disclosure provides a backlight unit including a waveguide layer 10 and a light source component 60. The waveguide layer 10 includes a light-entering surface located at its side surface, a bottom surface 11 at its bottom, and a light-exiting surface 12 located at its top. A first grating layer 20 is arranged at the bottom surface 11. A refractive layer is arranged at the light-exiting surface 12. The light source component 60 is located at or next to one side of the waveguide layer 10 where the light-entering surface is located, such that light emitted by the light source component 60 can be incident into the waveguide layer 10 through the light-entering surface at a predetermined angle. The refractive layer includes a plurality of refractive lens units 30. The refractive lens unit 30 converges the diffracted light dispersed by means of the diffraction caused by the first grating layer 20, when the backlight unit is in operation. The diffracted light refers to light formed after diffraction. In some embodiments, the diffracted light may be monochromatic light.

The light emitted from the light source component 60 enters into the waveguide layer 10 at a predetermined angle and propagates to the bottom surface of the waveguide layer 10 through the waveguide layer 10. The light transmitted to the grating structures of the first grating layer 20 is diffracted. The light emitted from the light source component 60 is dispersed, by the diffraction of the first grating layer 20, into the diffracted lights of different diffraction angles. The diffraction angle refers to an angle between the light formed after diffraction and the normal of the bottom surface. The light formed after diffraction is propagate to the light-exiting surface 12 at the top of the waveguide layer 10 through the waveguide layer 10, and refracted into the refractive lens unit 30 disposed at the light-exiting surface 12. The diffracted lights of different incident angles are converged at a point on the emergent surface of the refractive lens unit 30, and exits through the emergent surface of the refractive lens unit 30.

Figure 2:
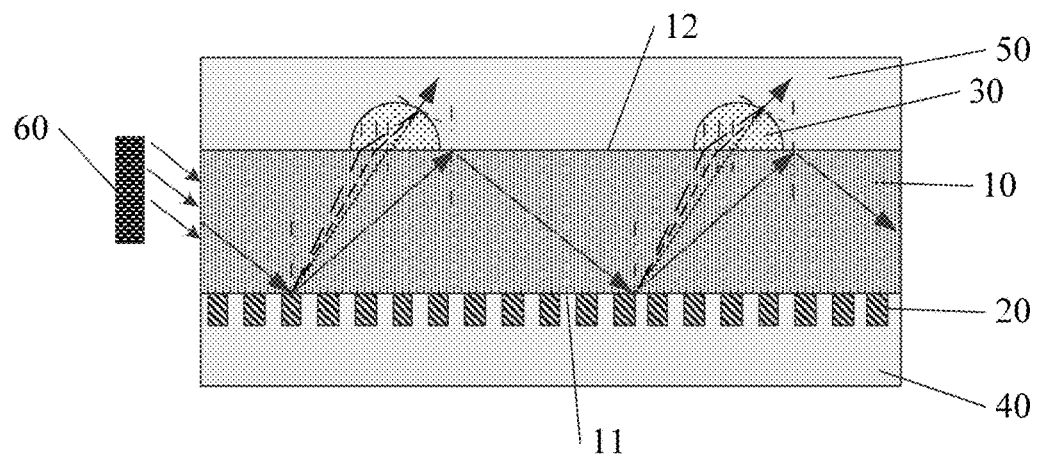
FIG. 2 schematically shows the structure of the backlight unit according to an embodiment of the present disclosure.

FIG. 2 schematically shows the structure of the backlight unit according to an embodiment of the present disclosure. The light source component 60 emits light. The emitted light has collimating characteristic. That is, the lights emitted by the light source are parallel to each other. The lights emitted by the light source impinge the light-entering surface of the waveguide layer 10 in the form of the collimated lights, and then being refracted into the interior of the waveguide layer 10. The collimated light, as incident light, has a certain limit with respect to its angle. The incident light enters into the interior of the waveguide layer 10 through the light-entering surface of the waveguide layer 10 at a critical angle (or an angle greater than the critical angle), that the light can be reflected by means of the total internal reflection at the bottom surface 11 and the light-exiting surface 12 of the waveguide layer 10 after entering the waveguide layer 10 in that incident angle.

The first grating layer 20 has a plurality of nanoscale grating components. In order to ensure the long-distance transmission of light in the waveguide layer 10 and multiple oscillation coupling with the nano-grating, the collimated light may be made by the semiconductor laser chips of the three colors of red, green and blue after light mixing, or may be made by the LED chips of the three colors of red, green and blue with relatively good collimating performance after light mixing, or may be made by white LED chips with relatively good collimating performance, or may be made by strip-shaped CCFL tubes with some light collimation structures. Alternatively, the light source may also made by incandescent lamps, halogen lamps, fluorescent lamps, sodium lamps, mercury lamps, fluorescent mercury lamps, xenon lamps, arc lamps, neon lamps, electroluminescence (EL) lamps, and light-emitting diode (LED) lamps, etc., together with some light collimation structures. The collimated light provided therein comprises, but is not limited to, these types. During the transmission, comparing with the lights diffracted in the different stages in the waveguide layer, the diffracted light rays are parallel to each other, and the reflected light rays are parallel to each other. The light source component 60 is located beside the side surface of the waveguide layer 10. Comparing with the related backlight located beside the substrate, the area occupied by the side-entry light source is smaller and this kind of light source will not be affected when the display panel is bent by force.

In some embodiments, the first grating layer 20 and the waveguide layer 10 are both transparent materials such as ITO, $Si_3N_4$, and the like. The first grating layer 20 is disposed at the bottom surface 11 of the waveguide layer 10 and includes a plurality of grating structures periodically arranged. The physical parameters of the first grating layer 20 (such as the grating period, the grating height, and the grating duty-cycle, etc.) are determined by a predetermined light exiting direction and light output intensity.

Specifically, the light entering the waveguide layer at a critical angle propagates through the waveguide layer to the bottom surface of the waveguide layer. If irradiated onto a position of the bottom surface where there is no grating structure, the light is reflected by a total internal reflection. If irradiated onto the grating structures at the bottom surface, the light is diffracted. Due to this phenomenon, the first grating layer at the bottom surface of the waveguide layer can result in a single-side light exiting at the light-exiting surface of the waveguide layer. Further, by controlling the grating period, height, duty-cycle and the like of the grating structure in the first grating layer, the amount of light exiting the light-exiting surface of the waveguide layer can be controlled, thereby the uniform light exiting at the light-exiting surface of the waveguide layer can be achieved.

Figure 4:
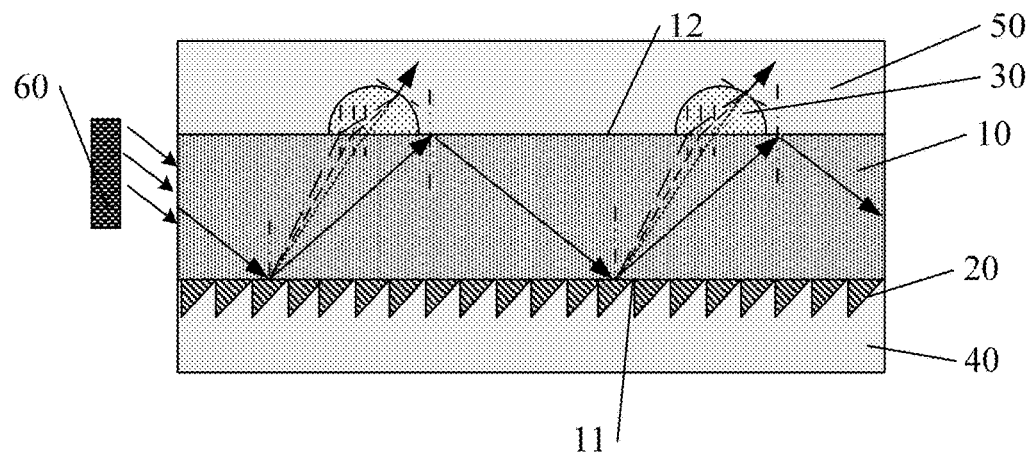
FIG. 4 schematically shows the structure of the backlight unit according to another embodiment of the present disclosure.

The first grating layer 20 provided by the present disclosure includes grating structures periodically arranged. The grating structure has a shape which is rectangular or jagged. The schematic diagram of the backlight unit including the jagged grating structures is shown in FIG. 4. In this grating structure, the rectangular gratings are replaced by the jagged gratings. The effect of single-side light exiting can be achieved by adjusting the grating period, grating height, grating duty-cycle or other parameters of the grating structure.

In some embodiments, the jagged grating includes likewise a transparent material such as ITO or $Si_3N_4$, etc. The collimated light is diffracted by the grating structures and dispersed into red light, blue light, and green light. According to the grating diffraction formula, the diffraction angle of each diffracted light dispersed by the same incident light is only related to the wavelength of each diffracted light. The red wavelength is the longest, and the blue wavelength is the shortest. Accordingly, the red light has the largest diffraction angle and the blue light has the smallest diffraction angle.

In some embodiments, the grating period is greater than 1000 nm in order to achieve the high contrast single-side light exiting in which only one side of the waveguide layer has optical energy loss. When practically designing the product, the grating period can also be set according to different contrast requirements. The duty-cycle of the grating structure is typically set to 0.5. in order to adjust the light intensity of the emitted light and the difference of the brightness at different panel positions, the duty-cycle ranges from 0.1 to 0.9. The grating height is sensitive to the lost energy. In some embodiments, the grating height ranges from 300 nm to 700 nm. In a more specific embodiment, the grating height can be 500 nm.

The refractive layer is disposed at the light-exiting surface 12 of the waveguide layer 10. In some embodiments, the refractive layer includes a plurality of refractive lens units 30 that are periodically arranged. The emergent surface of the refractive lens unit 30 may be an upper surface of the refractive lens unit 30. In other words, the refractive layer is a collection of refractive lens units 30. The backlight unit according to the present disclosure further includes a lower substrate 40 located at the bottom surface 11 and an upper substrate 50 located at the light-exiting surface 12. The upper substrate 50 covers the refractive layer, and the lower substrate 40 covers the first grating layer 20. In some embodiments, the material of the refractive lens unit 30 is a transparent material, such as a glass material. The refractive index of the refractive lens unit 30 is smaller than that of the waveguide layer 10 and smaller than that of the upper substrate 50, so that the refracted lights of the respective diffracted lights are converged more quickly, reducing the volume of the refractive lens unit 30. Specifically, a larger difference between the refractive index of the waveguide layer 10 and the refractive index of the lens refraction unit 30 will results in a faster converging of the refracted lights after the diffracted lights of different incident angles entering the refractive lens unit 30 and refracted, and a smaller volume of the refractive lens unit 30. The refractive index of the waveguide layer 10 is greater than the refractive index of the first grating layer 20, such that incident light experiences total internal reflection in the waveguide layer 10. The amount of light out-coupled by the waveguide layer 10 varies with the difference in refractive index between the waveguide layer 10 and the adjacent layer.

The refractive lens unit 30 is disposed at a position where the diffracted lights propagate to the light-exiting surface 12 of the waveguide layer. The calculation process of the position of each of the refractive lens units 30 on the light-exiting surface 12 of the waveguide layer 10 will be described below.

Firstly, refer to the grating diffraction formula:

$$p^*(\sin \theta_i + \sin \theta_j) = m\lambda \quad (1)$$

wherein, $\theta_i$ is the incident angle of the light beam at the waveguide layer 10, which is greater than or equal to the total internal reflection angle; $\theta_j$ is the diffraction angle of the grating, m is the diffraction order, λ is the wavelength, and p is the grating period.

According to the propagation path of the light and the incident angle, what can be determined is the distance S between the intersection of the diffracted light and the bottom surface and the orthographic projection point of the intersection of the diffracted light and the light-exiting surface on the bottom surface:

$$S = L^* \tan \theta_j \quad (2)$$

wherein L is the thickness of the waveguide layer 10, and $\theta_j$ is the diffraction angle of the first grating layer 20, i.e., the diffraction angle of the diffracted lights diffracted by the first grating layer 20.

Specifically, according to the position where the diffracted light exits the waveguide layer 10, the position of the boundary of the first refractive lens unit at the light-exiting surface 12 of the waveguide layer 10 can be determined. The position G of the boundary of the refractive lens unit closest to the light-entering surface is:

$$G = L^* \tan \theta_f \quad (3)$$

wherein, $\theta_f$ is the diffraction angle of the first one of the diffracted lights (the one with the shortest wavelength) emitted from the light-exiting surface 12, and L is the thickness of the waveguide layer 10. The position of the refractive lens unit 30 closest to the light-entering surface is the position where the diffracted lights being refracted on the light-exiting surface 12 for the first time.

The refractive layer includes a plurality of refractive lens units 30 arranged periodically. The distance D between the geometrical centers of two adjacent refractive lens unit 30 on the bottom surface is:

$$D = 2L^* \tan \theta_i \quad (4)$$

wherein $\theta_i$ is the incident angle of the light impinging the bottom surface of the waveguide layer after entering the waveguide layer the value of which is greater than or equal to the total internal reflection angle. L is the thickness of the waveguide layer. According to the position of the first refractive lens unit at the light-exiting surface 12 and the distance to a second refractive lens unit adjacent to the first refractive lens unit, the position of the second refractive lens unit can be determined, and the positions of all the refractive lens units 30 on the light-exiting surface 12 can then be determined.

With reference to the position of the refractive lens unit 30, and by setting appropriate refractive parameters, the diffracted lights which are dispersed by diffraction can be converged, i.e., setting the refractive parameter of the refractive lens unit 30 to make the dispersion caused by the refractive lens unit 30 being opposite to the dispersion caused by the first grating layer 20, which just eliminates the chromatic aberration caused by the first grating layer 20.

The present disclosure provides two design approaches to design the refractive parameters of the refractive lens unit 30. The first design approach is described below. In the first approach, the design process of the refractive parameter of the refractive lens unit is as follow:

When the refractive lens unit 30 is a plano-convex lens, that is, when the emergency surface of the refractive lens unit 30 is a spherical surface, if the first grating layer 20 is required to achieve single-sided light emission, the phase distribution function of the first grating layer 20 is as follows:

$$\phi(r) = A_1 r^2 + A_2 r^4 + A_3 r^6 + \ldots \quad (5)$$

where r is the structural parameter of the grating; $A_1$ is a quadratic phase coefficient expressing the paraxial focal power of the diffractive surface, which is used to eliminate the chromatic aberration of the system. Therefore, the focal power of the diffracted grating is:

$$\varphi_d = -2A_1 \quad (6).$$

With the analogy of the achromatic principle achieved by the doublet, the achromatic relationship equation of the refraction and diffraction color mixing lens can be obtained as follows:

$$\frac{\varphi_r}{V_r} + \frac{\varphi_d}{V_d} = 0 \quad (7)$$

wherein $\varphi_r$ is the focal power of the refractive lens unit, cod is the focal power of the diffracted grating, $V_r$ is the Abbe constant of the refractive lens unit, and $V_d$ is the Abbe constant of the diffractive lens, wherein, $$V_d = \frac{\lambda_b}{\lambda_r - \lambda_g}, \quad V_r = \frac{n_b}{n_r - n_g} \quad (8)$$

wherein, $\lambda_r$, $\lambda_g$, $\lambda_b$ are the wavelengths of the red light, the green light and the blue light respectively, and $n_r$, $n_g$, $n_b$ are the refractive indexes of the red light.

It is known that the relationship between the radius r of the refractive lens unit and the focal power $\varphi_r$ is:

$$\varphi_r = (1 - n_r)\frac{1}{r}. \quad (9)$$

According to the above formulas (5) to (9), the focal power $\varphi_r$ of the refractive lens unit can be obtained, and the radius parameter can be calculated. The radius r of the refractive lens unit is calculated as:

$$r = \frac{(1 - n_r)\lambda_b(n_r - n_g)}{2A_1 n_b(\lambda_r - \lambda_g)} \quad (10)$$

The second design approach of designing the refractive parameter of the refractive lens unit 30 will be described below. In the second approach, the design principle of the refractive parameter of the refractive lens unit 30 is as follow:

When the refractive lens unit 30 is a plano-convex lens, according to the diffraction formula, the lights having the largest difference of diffraction angle during the diffraction process is the blue light and the red light, that is, the most dominant chromatic aberration occurring during the diffraction process is the chromatic aberration between the blue light and the red light. In the drawings of the disclosure, the lights formed by diffraction are shown by dashed lines. A dashed ling with longer segments indicates a light with shorter wavelength (e.g., blue light), and a dashed line with shorter segments indicates a light with longer wavelength (e.g., red light). The essence of the correction of the chromatic aberration is basically the correction of the chromatic aberration between blue light and the red light. The distance between the intersection of the blue light and the light-exiting surface 12 and the intersection of the red light and the light-exiting surface 12 (i.e., the chromatic aberration of the diffracted light) is:

$$\Delta L_{FC} = L^*(\tan \theta_b - \tan \theta_r).$$

In the formula, $\theta_b$ and $\theta_r$ are diffraction angles of blue light and red light, respectively. Setting the refractive layer to cause a corresponding negative chromatic aberration will be necessary to eliminate the chromatic aberration caused by the first grating layer 20. The chromatic aberration value $\Delta L'_{FC}$ of the refractive lens unit is:

$$\Delta L'_{FC} = -L^*(\tan \theta_b - \tan \theta_r).$$

Since the refractive parameter of the refractive lens unit 30 is designed for the chromatic aberration caused by the diffraction of the grating, when the diffracted light enters the refractive lens unit 30, the refractive lens unit 30 adjusts the refractive paths of lights of different wavelengths. In some embodiments, the refractive lens unit 30 causes lights of different wavelengths converging in the refractive lens unit 30 at a certain position on the emergent surface of the refractive lens unit 30, and emit in the form of the light beam after passing through the converging of the upper substrate 50. Only the situation of one light beam is discussed here. In the situation of multiple beams, the exiting lights exit as parallel beams.

Figure 5:
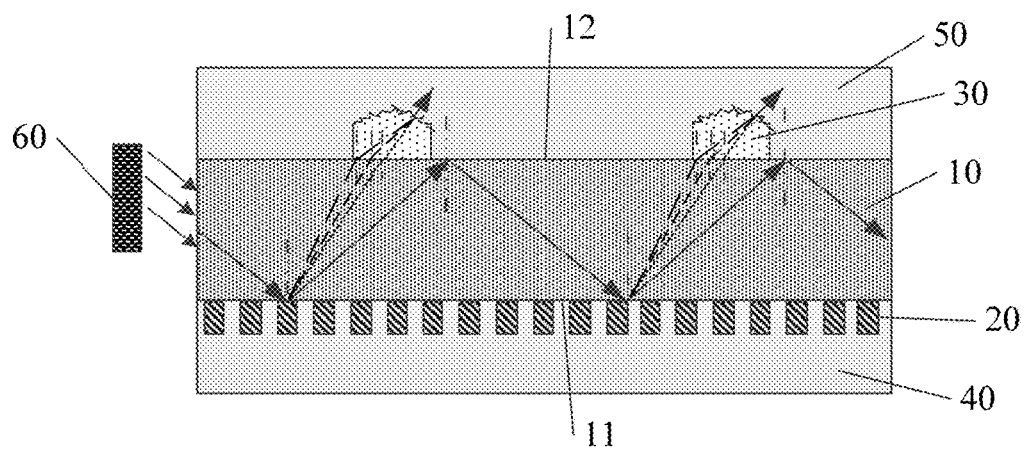
FIG. 5 schematically shows the structure of the backlight unit according to yet another embodiment of the present disclosure.

It should be noted that the shape of the emergent surface of the refractive lens unit may also be a free-form surface that satisfies the condition to achieve chromatic aberration correction. FIG. 5 schematically shows the structure of a free-form surface. In some embodiments, the refractive lens unit including the free-form surface is a transparent material and its refractive index is lower than that of the material of the upper substrate 50. The refractive parameter of such a refractive lens unit may be set to be the same as the refractive parameter of the refractive plano-convex lens.

In some embodiments, the waveguide layer 10 is a transparent material having a refractive index higher than the upper substrate 50 and the lower substrate 40, such as ITO or $Si_3N_4$. The thickness of the waveguide layer 10 may be, for example, 2 μm or even several tens of micrometers, but is not limited thereto. When the collimation of the collimated side-entry backlight is relatively good, or when the mode in which the light is coupled into the waveguide layer 10 can be effectively controlled, the requirement of the thickness of the waveguide layer 10 can be reasonably broadened (i.e., the thickness of the waveguide layer 10 can be thinner). For example, in this case, the thickness of the waveguide layer 10 may be several hundred nanometers.

In some embodiments, the upper substrate 50 and the lower substrate 40 are light-transmissive glass substrates or light-transmissive plastic substrates. In addition, the upper substrate 50 and the lower substrate 40 may also be composed of a substrate glass commonly used for an LCD or an OLED. The upper substrate 50 and the lower substrate 40 may also include some special optical glass or transparent resin materials and the like. In some embodiments, the thickness of the upper substrate 50 and the lower substrate 40 ranges from 0.1 mm to 2 mm, depending on the particular product design or process conditions. The refractive indexes of the upper substrate 50 and the lower substrate 40 may be basically equal or different. By "basically equal", it is meant that the difference between the refractive indexes of the upper substrate 50 and the lower substrate 40 is small than or equal to 0.2. In addition, one side of the upper substrate 50 close to the waveguide layer 10 and one side of the lower substrate 40 close to the waveguide layer 10 have a relatively good flatness and parallelism. In addition, the side of the upper substrate 50 away from the waveguide layer 10 and the side of the lower substrate 40 away from the waveguide layer 10 may be required to have a relatively good flatness and parallelism. In some embodiments of the present disclosure, the upper substrate 50 and the lower substrate 40 may not be provided in the backlight unit. In some embodiments, the upper substrate 50 and the lower substrate 40 may also be substrates having high transmittance and/or bendability.

The refractive index of the substrate 50 is required by the present disclosure to meet the requirements of the light converge. The upper substrate 50 covers the refractive lens unit 30. The emergent surface of the refractive lens unit 30 is attached to the light-entering surface of the upper substrate 50. The diffracted lights of different wavelengths are converged to a point on the emergent surface of the refractive lens unit 30, and exit through the emergent surface of the refractive lens unit 30 and enter the upper substrate 50 via the light-entering surface of the upper substrate 50. In order for the upper substrate 50 to converge the diffracted lights of different incident angles into a light beam for exiting, the refractive index of the upper substrate 50 is required to be larger than that of the refractive lens unit 30.

Figure 3:
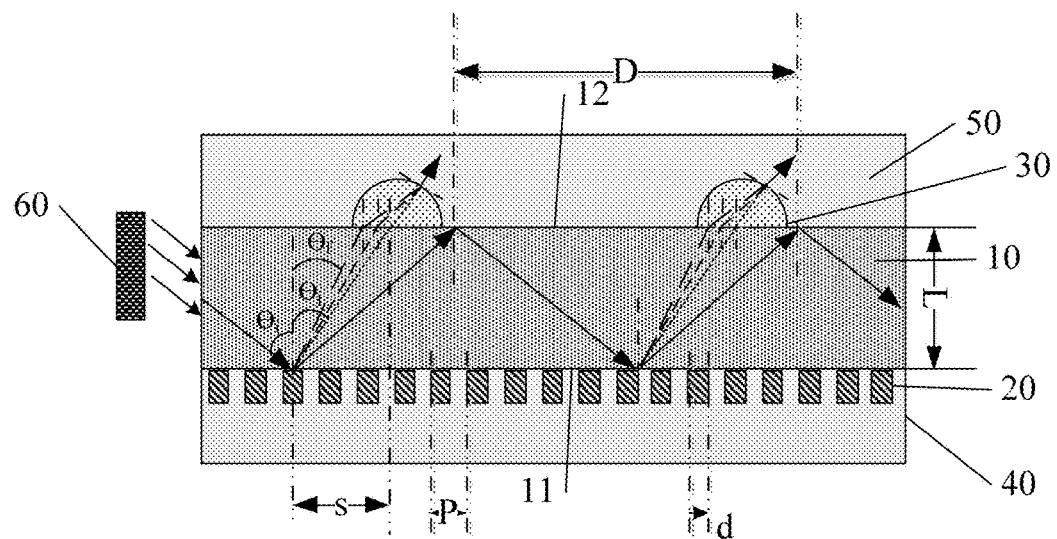
FIG. 3 schematically shows the propagation of the light emitted by the collimated side-entry backlight according to the present disclosure in the waveguide layer.

The traveling light path of the light emitted from the light source component 60 in the backlight unit according to the embodiment of the present disclosure is specifically described below. As shown in FIG. 3, light emitted by the light source component 60 is refracted into the waveguide layer 10 through the light-entering surface at a predetermined angle and transmitted to the bottom surface 11 and the first grating layer 20. Since the first grating layer 20 has a light splitting effect, the light transmitted to the first grating layer 20 is diffracted by the first grating layer 20 and travels to the light-exiting surface 12. Lights of different wavelengths are dispersed by diffraction of the first grating layer 20. After diffraction, the incident angles of the lights of different wavelengths at the light-exiting surface 12 are different. The diffracted lights of different incident angles enter the refractive lens unit 30 via the light-exiting surface 12. By setting the position and the refraction parameter of the refractive lens unit 30, the diffracted lights entering the refractive lens unit 30 is refracted by the refractive lens unit 30, and converge at the emergent surface of the refractive lens unit 30, and passed through the emergent surface of the refractive lens unit 30 to enter the upper substrate 50. The refractive index of the upper substrate 50 satisfies the requirement of the light converging to combine lights of different wavelengths and different incident angles into a light beam to exit the emergent surface of the refractive layer.

The diffraction angle of the grating structure is determined by the grating period P, the wavelength $\lambda$ of the incident wave, and the incident angle. After the grating period P is determined, lights of different wavelengths impinge the first grating layer 20 at the same incident angle and produce different diffraction angles by diffraction. Through the propagation of the waveguide layer 10, lights of different wavelengths reach the light-exiting surface 12 of the waveguide layer 10 at different incident angles, and enter the refractive lens unit 30 via the light-exiting surface 12. Lights of different wavelengths is refracted by the refractive lens unit 30, the refractive parameter of which is pre-designed, and the lights are converged at the emergent surface of the refractive lens unit 30, thereby eliminating the chromatic aberration caused by the grating diffraction.

The first grating layer 20 can control the light, which is incident to the waveguide layer 10 at a predetermined angle and then impinges the first grating layer 20, to be coupled back to the waveguide layer 10, while diffracting the light and making the light leaving the waveguide layer 10 from the light-exiting surface 12 of the waveguide layer 10. The refractive layer may refract light exiting the light-exiting surface 12 of the waveguide layer 10 at an intersection of the refractive layer and the light-exiting surface 12, and converge lights of different incident angles to a location of the emergent surface of the refractive layer, and exiting from the emergent surface.

FIGS. 2 to 5 illustrate backlight units according to embodiments of the present disclosure. In an embodiment, the grating layer 20 comprises a layer of periodically arranged grating structures. The grating structure may be rectangular or jagged (as shown in FIG. 4), and the emergent surface of the refractive lens unit 30 may be a plano-convex lens or a free-form surface (as shown in FIG. 5). The backlight unit includes a waveguide layer 10 and a light source component 60. The waveguide layer 10 includes a light-entering surface located at its side surface, a bottom surface 11 located at its bottom, and a light-exiting surface 12 located at its top. The bottom surface 11 is arranged with the first grating layer 20, and the light-exiting surface 12 is arranged with a refractive layer. The light source component 60 is disposed beside the light-entering surface such that light emitted by the light source component 60 can be incident into the waveguide layer 10 through the light-entering surface at a predetermined angle. The refractive layer includes at least a refractive lens unit 30. The refractive lens unit 30 converges the diffracted light dispersed by means of the diffraction caused by the first grating layer when the backlight unit is in operation.

The parameter settings of the waveguide layer 10, the first grating layer 20, the refractive layer (the reflective lens unit 30), the lower substrate 40, the upper substrate 50, and the light source component 60 are as described above.

After the light emitted by the light source component 60 is incident from the light-entering surface to the interior of the waveguide layer 10 in a preset angle (which may be the critical angle), the light propagates through the waveguide layer 10 to the bottom surface of the waveguide layer. If the light impinges a position on the bottom surface where no grating structure is provided, the total internal reflection occurs. If the light impinges the position where the grating structure is provided on the bottom surface, the diffraction occurs.

A light illuminating the grating structure is diffracted by the first grating layer 20 and re-enters the interior of the waveguide layer 10, and then travels to the light-exiting surface 12 in a predetermined exiting direction through the waveguide layer 10. Thereafter, the diffracted light enters into the refractive lens unit 30 via the light-exiting surface 12 of the waveguide layer 10. After calculation, the appropriate refraction parameters and positional parameters of the refractive lens unit 30 are set such that the diffracted lights entering the refractive lens unit 30 is refracted to converge to a point on the emergency surface of the refractive lens unit 30 and exit via the emergent surface of the refractive lens unit 30. The light exiting from the emergent surface enters into the upper substrate via the light-entering surface of the upper substrate. The upper substrate 50 realizes reassembling the diffracted lights of different incident angles into a light beam and then exiting the light beam. Since the refractive index of the upper substrate 50 is much larger than the refractive index of the refractive lens unit 30, the light rays are re-aggregated into a bundle of light and exiting from the upper substrate 50. With such a structure, the problem of chromatic aberration caused by grating diffraction is compensated.

Light that impinges a position on the bottom surface where no grating structure is provided experiences total internal reflection. Since the refractive index of the waveguide layer 10 is greater than the refractive indices of the refractive layer and the upper substrate 50, the light impinging the light-exiting surface 12 of the waveguide layer also undergoes total internal reflection and is reflected again to the bottom surface of the waveguide layer 10. Similarly, if the light illuminates a position on the bottom surface where there is no grating structure, the total internal reflection occurs. If the light illuminates to a position on the bottom surface having a grating structure, the diffraction occurs. The diffracted light repeats the above process and finally exits from the upper substrate 50. By controlling the physical parameters of the grating period, grating height, and duty cycle of the first grating layer, it can be achieved that all lights are emitted from the light-exiting surface of the upper substrate 50.

The backlight unit provided by the embodiment of the present disclosure, by combining the first grating layer having a negative chromatic aberration characteristic with a refractive layer having a positive chromatic aberration characteristic, utilizes the directional selectivity of the waveguide grating coupling to the exiting light to implement the single-side light exiting of the backlight unit. In addition, by providing a refractive layer on the light-exiting surface of the waveguide layer and adjusting the chromatic aberration caused by the first grating in the diffraction process using the positive chromatic aberration characteristic of the refractive lens unit, the chromatic aberration of the exiting light can be reduced or even eliminated, thereby improving the clarity of the display to enhance the user experience.

Figure 6:
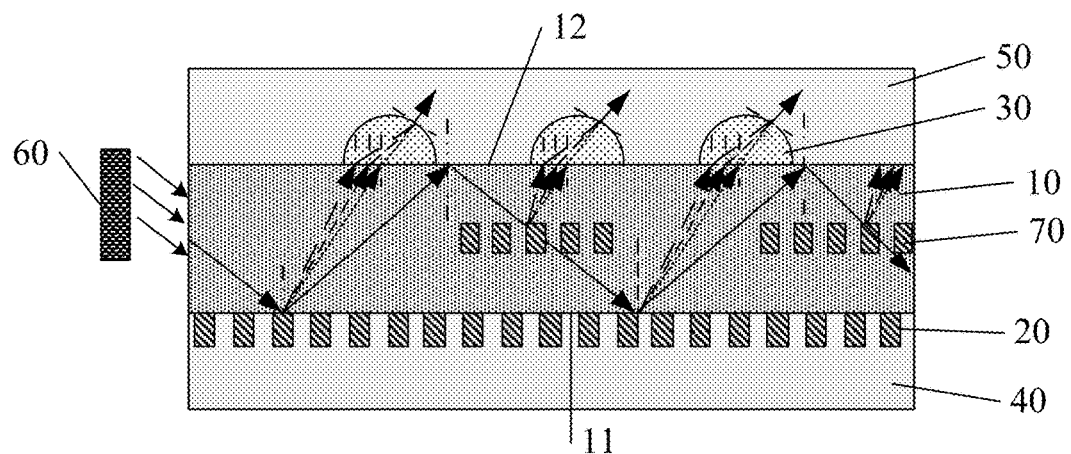
FIG. 6 schematically shows the structure of the backlight unit according to still another embodiment of the present disclosure.

Another embodiment of the present disclosure provides another structure of the backlight unit. FIG. 6 schematically shows a schematic view of such a structure. As shown in FIG. 6, unlike the foregoing embodiments, the waveguide layer 10 of the backlight unit further includes a second grating layer 70 for increasing the uniformity of the light field distribution of the single-sided light exiting.

The parameter settings of the waveguide layer 10, the first grating layer 20, the refractive layer (revolution lens unit 30), the lower substrate 40, the upper substrate 50, and the light source component 60 in this embodiment are the same as those in the foregoing embodiments and are not described herein again.

It should be noted that the first grating layer 20 and the second grating layer 70 both comprise periodically arranged grating structures. The grating structures may be rectangular or jagged.

The length of the first grating layer 20 is equal to the length of the waveguide layer 10. The second grating layer 70 includes a plurality of grating groups arranged at intervals. The radiant area of the light that is each time reflected at the light-exiting surface corresponds to one of the grating groups. The second grating layer 70 is a transmissive grating structure, and the material thereof is a transparent material such as silicon dioxide $SiO_2$ or other organic resin. The organic resin may include an organic high molecular material such as polymethyl methacrylate (PMMA). The physical parameters of the second grating layer 70 include the grating period, the grating height, the grating duty-cycle, and the like. These physical parameters may be the same as or different from the physical parameters of the first grating layer 20.

By adjusting the grating period, duty-cycle and the like of the first grating layer 20 and/or the second grating layer 70, the energy distribution of the exiting light and the diffracted light can be modulated to achieve the purpose of single-sided light exiting. The second grating layer 70 is a transmissive grating structure. In some embodiments, it can be a transparent material.

As can be seen from the light propagation path shown in FIG. 3, the diffracted lights tend to exit on one side of the diffraction point. If the physical parameters of the grating structure (such as the grating period, the grating width, etc.) are unreasonable, the phenomenon that some areas do not have light to exit is easy to appear in the light-exiting surface of the upper substrate, i.e., the "blind area". This phenomenon will have a great impact on the display.

Light illuminating a position of the bottom surface where there is no grating structure is totally internally reflected at the waveguide layer bottom surface 11. The light reflected to the light-exiting surface 12 of the waveguide layer also undergoes total internal reflection and is reflected to the second grating layer 70 and the first grating layer 20. A part or all of the lights is diffracted on the second grating layer 70. The second grating layer 70 is a transmissive grating. The light reflected to the second grating layer 70 are diffracted. The diffracted light propagates to the light-exiting surface 12 of the waveguide layer and exits the upper substrate through the refractive lens unit 30. The process from the diffraction to the refractive lens unit 30 to the exit from the upper substrate is the same as the foregoing embodiment and will not be described again.

Accordingly, the position and refractive parameters of the refractive lens unit 30 can be adjusted to converge the diffracted light dispersed by the first grating layer and the second grating layer, and finally exiting from the upper substrate.

Since the lights impinging the second grating layer 70 comprise both the light reflected by the light-exiting surface 12 of the waveguide layer and the light reflected by the bottom surface 11 of the waveguide layer, the light formed by the diffraction of the second grating layer 70 has a larger range of angles. The second grating layer 70 is closer to the light-exiting surface 12 of the waveguide layer than the first grating layer 20, so that light diffracted to the light-exiting surface 12 of the waveguide layer can more easily cover the light-exiting surface 12 of the waveguide layer. While implementing the backlight unit's single-sided light exiting, this embodiment increases the uniformity of the light exiting on the light-exiting surface and avoids optical blind area on the display panel.

In contrast to the situation of only the first grating layer 20, by providing two layers of gratings, the time when the second grating layer 70 receives the light reflected from the light-exiting surface 12 of the waveguide layer 10 is earlier and the position at which the reflected light is received is closer to the light-exiting surface 12, during the same reflection period. The area covered by the diffracted light of the second grating layer 70 on the light-exiting surface 12 of the waveguide layer 10 is closer to the light-entering surface or the area covered by the diffracted light of the first grating layer 20 on the light-exiting surface 12 of the waveguide layer 10, thereby narrowing the optical blind area between the diffracted lights in the adjacent diffraction periods and increasing the uniformity of the light field of the exiting lights.

In some embodiments, the second grating layer is located intermediate the light-exiting surface 12 and the bottom surface of the waveguide layer 10. The reflected light reflected at the light-exiting surface 12 of the waveguide layer 10 is incident at the second grating layer 70 and is diffracted at the second grating layer 70. The boundary of the cover area of the diffracted lights of two adjacent periods on the light-exiting surface 12 of the waveguide layer 10 coincide, thereby avoiding the occurrence of optical blind area, therefore achieving full-surface light exiting on the light-exiting surface 12.

It should be noted that, based on the same idea, on the basis of the embodiment of the present disclosure, the waveguide layer 10 may further include a third grating layer for increasing the uniformity of the light field distribution of the single-side light exiting, to further promote the implementation of the uniform single-side light exiting on the light-exiting surface 12. The position of the third grating layer in the waveguide layer 10 can be obtained from the diffraction formula and the geometrical optical knowledge.

The backlight unit can be applied to devices with high directivity to outgoing light, such as displays, telescopes, microscopes, and the like.

The present disclosure also provides a display device. The display device includes the backlight unit according to any of the above embodiments.

It should be noted that the display device provided by the present disclosure may be any product or component having a display function, such as an electronic paper, an OLED panel, a mobile phone, a tablet computer, a television, a display, a notebook computer, a digital photo frame, a navigator, and the like.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. The word 'comprising' does not exclude the presence of elements or steps other than those listed in a claim. The word "a" or "an" preceding an element does not exclude the presence of a plurality of such elements. The usage of the words first, second and third, etcetera do not indicate any ordering. These words are to be interpreted as names.

What is claimed is:

1. A backlight unit, comprising a waveguide layer and a light source component, wherein the waveguide layer comprises a light-entering surface located at a side surface of the waveguide layer, a bottom surface located at a bottom of the waveguide layer, and a light-exiting surface located at a top of the waveguide layer, wherein a first grating layer is arranged at the bottom surface, a refractive layer is arranged at the light-exiting surface, the light source component is located beside the light-entering surface, the refractive layer comprises a plurality of refractive lens units configured to converge a diffracted light dispersed by means of diffraction caused by the first grating layer when the backlight unit is in operation wherein one of the plurality of refractive lens units closest to the light-entering surface is in a location area where the diffracted light is refracted on the light-exiting surface for the first time, and the distance D between geometric centers of two adjacent refractive lens units is:

$$D=2L*\tan\theta_i,$$

wherein $\theta_i$ is the incident angle of a light emitted by the light source component at the waveguide layer, and L is the thickness of the waveguide layer.

2. The backlight unit of claim 1, wherein the light-entering surface is perpendicular to the light-exiting surface and the bottom surface is parallel to the light-exiting surface.

3. The backlight unit of claim 1, wherein the plurality of refractive lens units are arranged in a periodic manner.

4. The backlight unit of claim 1, wherein an emergent surface of each of the plurality of refractive lens units is a spherical surface or a freeform surface.

5. The backlight unit of claim 1, wherein the distance S between an intersection of the diffracted light and the bottom surface and an orthographic projection point of an intersection of the diffracted light and the light-exiting surface on the bottom surface is:

$$S=L*\tan\theta_j$$

wherein $\theta_j$ is the diffraction angle of the diffracted light, and L is the thickness of the waveguide layer.

6. The backlight unit of claim 1, wherein the chromatic aberration value $\Delta L'_{FC}$ of each of the plurality of refractive lens units is:

$$\Delta L'_{FC}=-L*(\tan\theta_b-\tan\theta_r),$$

wherein $\theta_b$ and $\theta_r$ are respectively the diffraction angles of a blue light and a red light formed through diffraction, and L is the thickness of the waveguide layer.

7. The backlight unit of claim 4, wherein when the emergent surface of each of the plurality of refractive lens units is a spherical surface, the radius r of which is:

$$r=\frac{(1-n_r)\lambda_b(n_r-n_g)}{2A_1n_b(\lambda_r-\lambda_g)},$$

wherein $A_1$ is the paraxial focal power of a diffraction surface of the first grating layer, $\lambda_r$, $\lambda_g$, $\lambda_b$ are the wavelengths of a red light, a green light and a blue light respectively, and $n_r$, $n_g$, $n_b$ are the refractive indexes of the red light, the green light and the blue light respectively.

8. The backlight unit of claim 1, wherein the first grating layer comprises grating structures arranged in a periodic manner.

9. The backlight unit of claim 8, wherein the shape of the grating structures is rectangular or jagged.

10. The backlight unit of claim 1, wherein the material of the first grating layer is ITO or $Si_3N_4$.

11. The backlight unit of claim 1, wherein a second grating layer is arranged inside the waveguide layer.

12. The backlight unit of claim 1, further comprising a lower substrate located at a side of the bottom surface of the waveguide layer and an upper substrate located at a side of the light-exiting surface of the waveguide layer, wherein the refractive index of the upper substrate is greater than the refractive index of the refractive lens unit.

13. The backlight unit of claim 12, wherein the refractive index of the upper substrate and the refractive index of the lower substrate are smaller than the refractive index of the waveguide layer, and the refractive index of the upper substrate is basically equal to the refractive index of the lower substrate.

14. A display device comprising the backlight unit according to claim 1.

\* \* \* \* \*